March 29, 1932.  M. ZUCKER  1,851,692

ELECTRIC REGULATOR

Filed April 17, 1931

Inventor:
Myron Zucker,
by Charles V. Tuella
His Attorney.

Patented Mar. 29, 1932

1,851,692

UNITED STATES PATENT OFFICE

MYRON ZUCKER, OF ROYAL OAK, MICHIGAN, ASSIGNOR TO GENERAL ELECTRIC COMPANY, A CORPORATION OF NEW YORK

ELECTRIC REGULATOR

Application filed April 17, 1931. Serial No. 530,878.

My invention relates to apparatus for regulating an electrical condition of a dynamo-electric machine or circuit and more particularly to such apparatus utilizing electric valves for effecting the desired regulation.

Heretofore there have been proposed various arrangements including electric valves for regulating an electrical condition of a dynamo-electric machine or circuit. Certain of these arrangements of the prior art have effected the desired regulation by controlling the phase relation between the grid and anode potentials of the electric valves. My invention relates to regulating apparatus of the latter type.

It is an object of my invention to provide an improved regulating apparatus utilizing electric valves for regulating an electrical condition of a dynamo-electric machine or circuit, by means of which the arrangements of the prior art may be materially simplified.

It is another object of my invention to provide an improved regulating apparatus utilizing electric valves for regulating an electrical condition of a dynamo-electric machine or circuit in which the desired regulation is effected by varying the phase relation between the grid and anode potentials of the electric valves.

It is a further object of my invention to provide an improved electric circuit for producing a potential variable in phase with respect to that of an alternating current circuit which is of general application but which is particularly suitable for controlling the electric valves of my improved motor control circuit.

In accordance with one embodiment of my invention, the field circuit of a direct current motor is energized from an alternating current circuit through a pair of electric valves. In order to control the amount of energy transmitted by the valves and thus the excitation of the motor, I provide an improved phase shifting circuit for varying the phase of the grid potentials of the valves with respect to their anode potentials. This improved phase shifting circuit comprises a resistor and a saturable reactor connected in series across the alternating current circuit. Provision is made for energizing the saturating winding of the reactor in accordance with the armature current of the motor, thus serving to maintain the load on the motor substantially constant.

Figure 1:
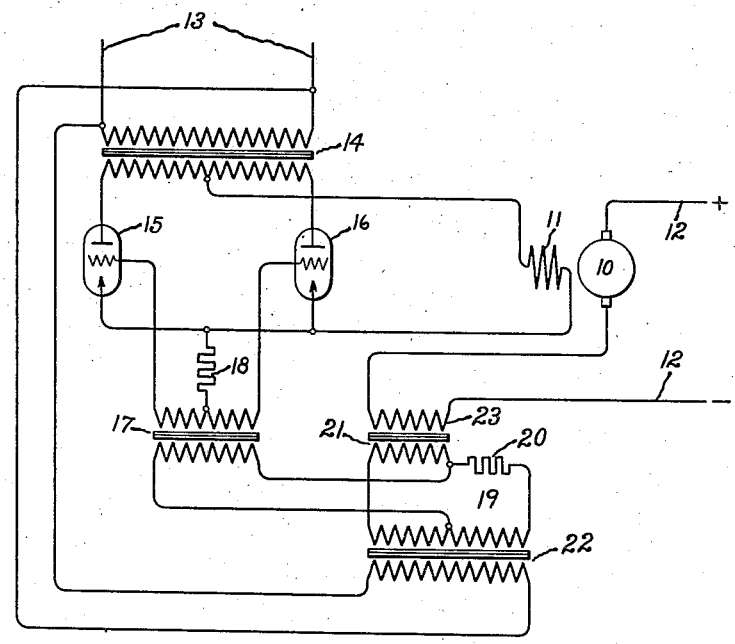
Figure 2:
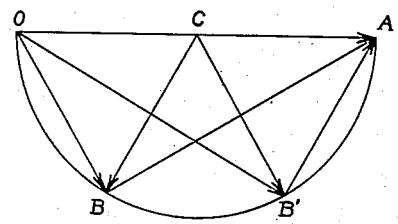

For a better understanding of my invention together with other and further objects thereof, reference is had to the following description taken in connection with the accompanying drawings and its scope will be pointed out in the appended claims. Figure 1 of the accompanying drawings illustrates my invention as applied to an arrangement for maintaining constant the load on a direct current motor. Figure 2 shows a vector diagram.

Referring now to the drawings I have illustrated an arrangement for controlling the excitation of a field winding 11 of a direct current motor 10, in response to variations in the armature current of the motor. The armature of the motor 10 is energized from a suitable source of direct current 12, preferably of constant potential. The excitation of the winding 11 is derived from a source of alternating current 13 through a full wave rectifier comprising the transformer 14 and electric valves 15 and 16. Electric valves 15 and 16 are each provided with an anode, a cathode and a control grid and may be of any of the several types well known in the art, although I prefer to use valves of the vapor electric discharge type in which the starting of current in the valve is determined by the potential on the control grid, but in which the current through the valve can be interrupted only by reducing its anode potential below the critical value. The grids of the valves 15 and 16 are connected to the common cathode circuit through opposite halves of the secondary winding of a grid transformer 17 and a current limiting resistor 18. The primary winding of the grid transformer 17 is energized from a phase shifting circuit 19 comprising a resistor 20 and a saturable reactor 21 connected across the secondary winding of a transformer 22, the primary winding of which is energized from the alternating current circuit 13. The primary winding of transformer 17 is preferably connected between the junctions of resistor 20 and reactor 21 and an electrical midpoint of the secondary winding of transformer 22. The reactor 21 is provided with a saturating winding 23 which is connected in series with the armature circuit of the motor 10.

In explaining the operation of the above described apparatus it will be assumed that initially the excitation of the field winding 11 is sufficient to maintain a proper speed of the motor 10 for the desired load which it is desired that the motor 10 shall deliver and that the saturation of the reactor 21 by the winding 23 is just sufficient to maintain the phase of the grid potentials of the valves 15 and 16 at a proper value to maintain the required excitation. This condition may be seen more clearly by referring to Fig. 2 in which the vector OA represents the potential across the secondary winding of the transformer 22, the point C the potential of the midpoint of this winding, the vector OB the potential drop across the resistor 20 and vector BA the potential drop across the reactor 21, so that the vector CB represents the potential applied to the grids of the valves 15 and 16. Should the load on the motor tend to increase for any cause, the armature current of the motor 10 will increase the saturation of reactor 21 thus decreasing its impedance and the component of the vector OA which appears across it. In this condition the vector OB' represents the potential across resistor 20 and the vector B'A the potential across reactor 21. It is seen that the grid potential of the valves 15 and 16 as represented by the vector CB' has advanced in phase with an increase in the armature current of the motor 10. The result is that the output of the rectifier is increased and with it the excitation of the field winding 11 which serves to decrease the speed of the motor and thus lower the load to its normal value. By the use of a saturable reactor as one of the elements of my improved phase shifting circuit, it is seen that all moving parts and contacts are eliminated and that a phase shifting circuit is provided which is readily adjustable in accordance with variations in the current of the circuit to be controlled.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a dynamo-electric machine provided with field and armature windings, an alternating current circuit, means for energizing one of said windings from said circuit including an electric valve provided with a control grid, a resistor and a variable reactor serially connected across said circuit for producing dephased potentials, connections for impressing upon said control grid a potential derived from said series circuit and means responsive to an electrical condition of said machine for controlling said reactor.

2. In combination, a dynamo-electric machine provided with field and armature windings, an alternating current circuit, means for energizing said field winding from said circuit including an electric valve provided with a control grid, a reactor provided with a saturating winding and a resistor serially connected across said circuit for producing dephased potentials, connections for impressing upon said control grid a potential derived from said series circuit, and means responsive to an electrical condition of said machine for controlling the energization of said saturating winding.

3. In combination, an alternating current supply circuit, a direct current motor provided with field and armature windings, an electric valve for energizing said field winding from said alternating current circuit, a separate source of direct current for energizing said armature winding, and means responsive to the load on said motor for controlling the conductivity of said valves.

4. In combination, an alternating current supply circuit, a direct current motor provided with field and armature windings, an electric valve, provided with a control grid, for energizing said field winding from said supply circuit, a separate source of direct current for energizing said armature winding, and means responsive to variations in the load on said motor for impressing upon said grid an alternating potential variable in phase with respect to that of said supply circuit.

5. In combination, an alternating current supply circuit, a direct current motor provided with field and armature windings, means for energizing said field winding from said supply circuit including an electric valve provided with a control grid, an impedance phase shifting circuit for exciting said control grid, and means responsive to the armature current of said motor for controlling said phase shifting circuit.

6. In combination, a source of alternating potential, a direct current circuit, and means for producing an alternating potential variable in phase with respect to that of said source in response to an electrical condition of said direct current circuit comprising a plurality of impedance elements connected across said source for producing dephased potentials, one of said elements comprising a saturable reactor, and means responsive to said electrical condition of said direct current circuit for varying the saturation of said reactor.

7. In combination, a dynamo-electric machine provided with armature and field windings, an energizing circuit for said field winding including an electric valve provided with a control grid, an impedance phase shifting circuit for controlling the phase of the potential of said grid, and means responsive to the current in said armature for controlling the impedance of one of the elements of said phase shifting circuit.

8. In combination, a dynamo-electric machine provided with armature and field windings, an energizing circuit for said field winding including an electric valve provided with a control grid, an impedance phase shifting circuit including a saturable reactor, a connection for exciting said control grid with a potential variable in phase derived from said phase shifting circuit, and means responsive to the current flowing in said armature for controlling the saturation of said reactor.

In witness whereof, I have hereunto set my hand.

MYRON ZUCKER.